May 10, 1932. G. BERTANDEAU 1,857,233
APPARATUS FOR THE MANUFACTURE OF OBJECTS CONSISTING OF
AGGLOMERATED SUBSTANCES BY CENTRIFUGAL FORCE
Filed May 31, 1929
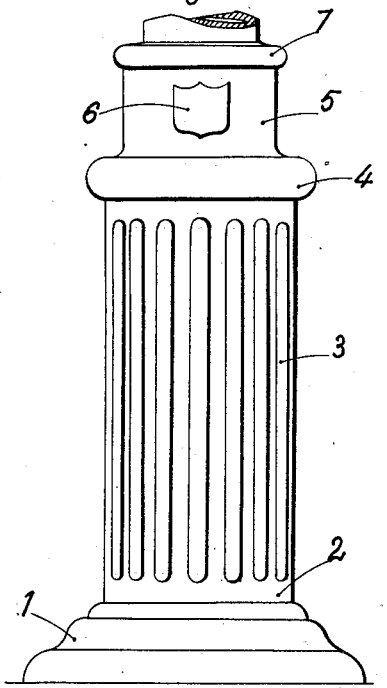
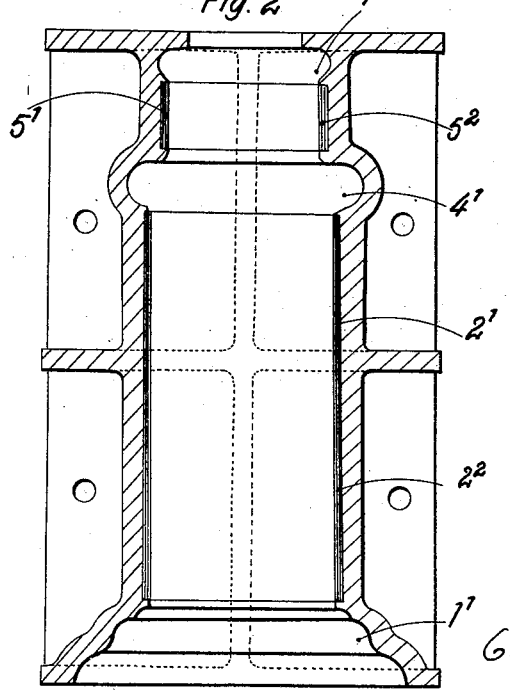
G. Bertandeau
INVENTOR Patented May 10, 1932

1,857,233

UNITED STATES PATENT OFFICE

GASTON BERTANDEAU, OF PARIS, FRANCE, ASSIGNOR TO SOCIETE STAC-NORD, OF PARIS, FRANCE, A CORPORATION OF FRANCE

APPARATUS FOR THE MANUFACTURE OF OBJECTS CONSISTING OF AGGLOMERATED SUBSTANCES BY CENTRIFUGAL FORCE

Application filed May 31, 1929, Serial No. 367,377, and in France June 18, 1928.

The present invention relates to a centrifugal process for the manufacture of objects consisting of agglomerated substances, such as cement, mortar or the like characterized by the simultaneous use of a rigid and a plastic, elastic or flexible substance, to form the support upon which the material subjected to the centrifugal process is applied.

The rigid substance forming the mold itself, consists of metal or other material, and has various lathe-turned or trimmed parts. At the parts which are to receive decorative patterns, the said mold will be provided with sheets of a plastic, elastic or flexible substance, carrying in sunken relief the ornaments which are to appear in high relief on the finished product, or inversely.

The said sheets of plastic, elastic or flexible material remain attached to the object obtained by the centrifugal process, and are then removed by hand.

Due to the nature of such sheets of plastic, elastic or flexible material, it is feasible to obtain high or low relief parts having perfectly sharp edges or ridges, so that no finishing will be required.

In order to secure the said sheets, the apparatus preferably comprises annular grooves or recesses of suitable form provided in the mold, into which the sheets are inserted, but this method of securing the sheets is given solely by way of example. The following description shows an embodiment of the invention, by way of example.

In the accompanying drawings:

Fig. 1 is an elevational view of a base of a street lamp consisting of material treated by the centrifugal process.

Fig. 2 is a section on the axis of the mold.

As shown in Fig. 1, the base of the street lamp comprises parts of different diameters, certain of which have decorative patterns on the periphery. In this manner, the part 1 of the base which rests on the ground has three decreasing steps, above which is a cylindrical part of a certain height ornamented as shown at 3. Herein the decoration consists of straight raised parts disposed according to the generatrices of the cylinder. Above this part of the base is an enlarged beading 4, followed by a cylindrical part 5, decorated as shown at 6 with an emblem showing the city arms or the like. Above this is a beading 7 extending slightly from the cylindrical part 5.

The mold, which is metallic in this construction, and is adapted to produce the said base by the centrifugal process, is shown in Fig. 2, and is constituted in the known manner by two or more parts secured together by bolts and nuts or the like.

The plain parts of the base 1, 4, 7, are molded directly upon the metal of the mold, or at $1^1$, $4^1$, $7^1$.

As to the ornamental parts 2 and 5, these are formed by the use of sheets of plastic, elastic or flexible substances $2^1$, $5^1$, which are suitably inserted in corresponding recesses $2^2$, $5^2$ in the said mold. The said sheets carry in sunken relief the decorative patterns which are to be reproduced in raised relief on the base, or inversely.

The material is placed in the mold, and the centrifugal process is then applied, after which the material is removed from the mold by separating its parts, which material is readily detached.

On the contrary, the sheets $2^1$, $5^1$, adhere to the resulting base and are then removed by hand. Due to the flexibility of the said sheets, there are obtained high or sunken relief parts, with very smooth edges or ridges, which need no finishing.

By the said centrifugal process, it is also feasible to produce objects in which are inserted, for decorative purposes, various substances differing from the main substance, this being effected during the centrifugal process or after the object has been formed, and they can be disposed in recesses formed for the purpose during the centrifugal process, thus inserting luminous windows, decorated medallions clasps, or the like.

I claim:

An apparatus for the manufacture by centrifugal force, of objects of agglomerated material, comprising a solid mold being provided with recesses of suitable shape into which are inserted sheets of a plastic, elastic or flexible substance insertible in said recesses, having therein in sunken relief the ornaments which are to appear in high relief and inversely.

In testimony whereof he has signed this specification.

GASTON BERTANDEAU.